United States Patent [19]
Erickson

[11] Patent Number: 5,176,014
[45] Date of Patent: Jan. 5, 1993

[54] FAUCET LOCKING APPARATUS

[76] Inventor: William Erickson, P.O. Box 4801, Thousand Oaks, Calif. 91359

[21] Appl. No.: 669,472

[22] Filed: Mar. 14, 1991

[51] Int. Cl.⁵ ............................................. F16B 41/00
[52] U.S. Cl. ...................................................... 70/232
[58] Field of Search .......... 70/175, 180, 212, 229–232; 285/80, 83, 86, 92; 220/288, 315; 215/229–231

[56] References Cited

U.S. PATENT DOCUMENTS

| | | | |
|---|---|---|---|
| 1,205,907 | 11/1916 | Lesmann | 215/329 X |
| 1,580,016 | 4/1926 | Collins | 220/315 X |
| 1,592,147 | 7/1926 | Mletschnig | 215/330 |
| 2,641,124 | 6/1953 | Gallagher et al. | 70/232 |
| 3,459,443 | 8/1969 | Butters et al. | 285/92 X |
| 3,678,717 | 7/1972 | Eaton | 70/232 |
| 4,141,574 | 2/1979 | Stansifer et al. | 285/92 |
| 4,285,221 | 8/1981 | Atchisson | 70/232 X |
| 4,407,146 | 10/1983 | Nielsen, Jr. | 70/232 |
| 4,516,414 | 5/1985 | Woolvin | 70/180 X |
| 4,777,811 | 10/1988 | Binkley | 70/232 X |
| 4,803,858 | 2/1989 | Parker | 70/231 |
| 4,826,215 | 5/1989 | Sullivan | 285/80 |
| 4,848,458 | 7/1989 | Holdsworth et al. | 166/92 |

Primary Examiner—Alexander Grosz
Assistant Examiner—Suzanne L. Dino
Attorney, Agent, or Firm—Jack C. Munro

[57] ABSTRACT

A cap to be placed over the spout of a faucet and form a tight watertight connection therebetween. Located through the cap is a through hole through which a shackle of the padlock is to be located with this shackle to interfere with the exterior threaded connection on the spout and prevent disengagement of the cap from the faucet. With this cap installed on the spout of the faucet, flow of water through the faucet is prevented.

4 Claims, 1 Drawing Sheet

U.S. Patent    Jan. 5, 1993    5,176,014
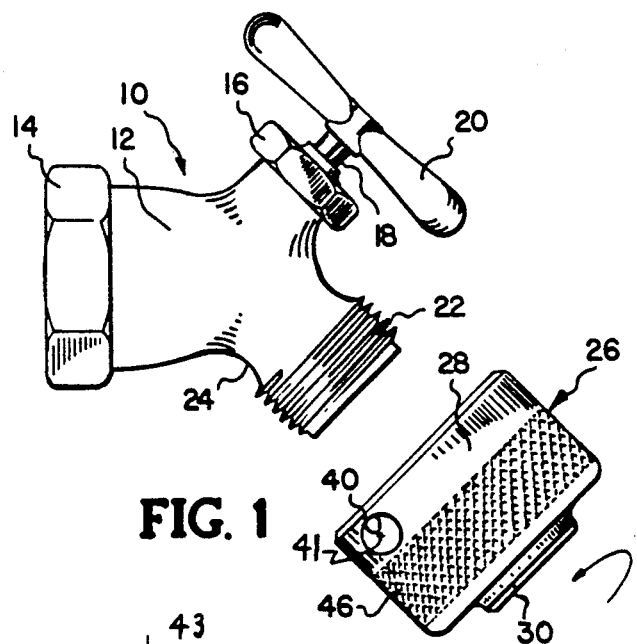
FIG. 1
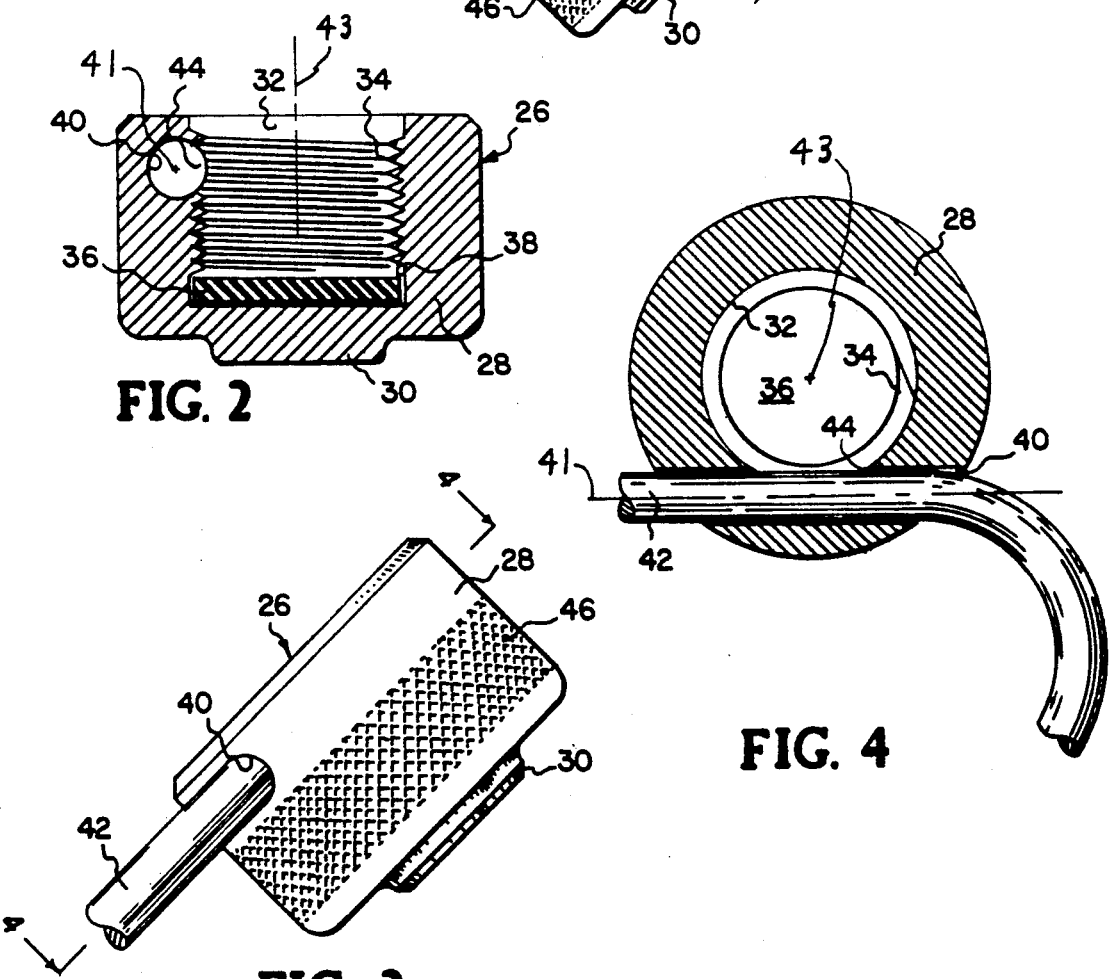
FIG. 2
FIG. 4
FIG. 3

FAUCET LOCKING APPARATUS

BACKGROUND OF THE INVENTION

1) Field of the Invention

The field of this invention relates to locking devices and more particularly to a locking device for a faucet to prevent flow of water through the faucet.

2) Description of Related Art

The use of water faucets has long been known in conjunction with any kind of a building structure such as an office building, apartment house or individual residence. A typical water faucet includes a manually operated valve which is capable of being open and when open water is caused to flow through the valve and through a spout into the ambient. Normally, these faucets can be operated by anyone.

In some areas of the world, water is a valuable commodity. For example, some areas of the United States have severe restrictions as to the amount of water that can be used by a residence, apartment or place of business. If usage exceeds a certain preset level, the cost for water usage substantially increases and may include a penalty. If excessive usage continues, an individual's water can actually be turned off for a period of time.

In almost every building, apartment and house there are water faucets that are readily available to be used by anyone who has access to the exterior of the structure. In these areas of water usage restriction, a person may take a hose, connect it to somebody else's faucet and then use that water for some purpose such as washing a vehicle, filling containers that can then be used to water plants, etc. There is a need to affix some device to a water faucet that will prevent the operation of that faucet except by the authorized individual or individuals.

Previously, there have been devices constructed to provide a closure for a fluid conduit. Reference is to be had to U.S. Pat. No. 1,656,318, inventor Costello, which shows such a closure for a fluid conduit. In this patent, there is required the addition of a special attachment to the end of the fluid conduit prior to the installation of the cap which closes the fluid conduit. The same is also true for a device defined within U.S. Pat. No. 4,848,458, inventor Holdsworth, et al. The present invention does not require the use of any additional item that is to be attached to the fluid conduit prior to the installation of the device to close off the conduit.

There is also known within the prior art to use locking devices to prevent unauthorized removal of a garden hose from a faucet. Typical such devices are shown within U.S. Pat. No. 4,803,858, inventor Parker and U.S. Pat. No. 3,678,717, inventor Eaton.

SUMMARY OF THE INVENTION

The structure of this invention relates to a cap-type of device which is to be threadably secured on the externally threaded hose bibb section of a water faucet. Within the cap is located a resilient member which presses against the opened mouth spout of the faucet and closing such preventing leakage of water past the cap when the cap is installed. Conducted through the cap is a through hole with this through hole connecting with the interior chamber of the cap. The location of this through hole is so that it is behind the enlarged threaded area of the hose bibb of the faucet. A rod, such as a shackle of a padlock, is to be conducted through the through hole and, since it is located behind the threaded section, interferes with such and will prevent the cap from being unscrewed from the faucet. If this padlock is locked, only an individual who has a key to the padlock can then utilize the faucet. Thereby, unauthorized usage of the faucet is prevented.

The primary objective of the present invention is to construct a device which is inexpensive to manufacture and therefore can be sold to the ultimate consumer in an inexpensive price and can be conveniently utilized to prevent unauthorized usage of water from the faucet.

BRIEF DESCRIPTION OF THE DRAWING

FIG. 1 is an exploded side elevational view of the structure of the present invention showing its relationship to a conventional faucet;

FIG. 2 is a longitudinal cross-sectional view through the locking apparatus of the present invention showing clearly the internal structure of the locking apparatus;

FIG. 3 is an exterior view of the locking apparatus depicting its connection to the shackle of a padlock; and FIG. 4 is a transverse cross-sectional view of the locking apparatus of this invention taken along line 4—4 of FIG. 3.

DETAILED DESCRIPTION OF THE SHOWN EMBODIMENT

Referring particularly to the drawing, there is shown a conventional faucet 10 which has a body 12 which has an inlet opening located about a polygonal shaped nut 14. Water is to be conducted into the inlet opening with the nut 14 to be installed onto a conduit (not shown). Within the body 12 is located a valve mechanism which is to be either closed or open through operation of a stem 18. Operation of the stem 18 is accomplished manually by pivoting handle 20. Stem 18 is mounted in position on the body 12 by means of a packing nut 16.

The body 12 of the faucet 10 includes a spout through which the water is to be conducted into the ambient. Formed on the exterior surface of the spout is a series of screw threads 22. Located directly adjacent the screw threads 22 and formed as part of the body 12 is an annular concave area 24.

The locking apparatus of this invention comprises a cap 26 which is formed of a housing 28. The exterior surface of the housing 28 includes an annular knurled section 46 which is to facilitate manual rotation of a locking apparatus 26. The housing 28 also includes a boss section 30 which is included solely for the purpose of ornamentation.

The housing 28 includes an access opening 32 which provides access into interior chamber 38. The sidewall of this interior chamber 38 includes a series of internal screw threads 34. The inner end of this interior chamber 38 includes a resilient member 36. Typical construction of the resilient member 32 would be a plastic or rubber. Generally, the member 36 is in the form of an annular disc but could comprise a washer.

Formed through the housing 28 of the cap 26 is a through hole 40. This through hole 40 has a longitudinal center axis 41. The internal chamber 38 also has a longitudinal center axis 43. Axis 41 is located in a perpendicular, but spaced therefrom, relationship to axis 43. Longitudinal axis 41 is located transverse to the axis 43. Actually, the desirable transverse relationship is that of perpendicularity. Through hole 40 is located directly adjacent the access opening 30 and spaced some distance from the inner closed end of the interior chamber 38. The through hole 40 includes a cutout 44 with this cutout 44 connecting with the internal chamber 38.

The housing 28 of the cap 26 is to be placed against the faucet 10 with the threads 34 engaging with threads 22. The housing 28 is to be tightened so that the outer end of the spout of the faucet 10 is to abut tightly against resilient member 36. At this particular time, if an individual would proceed to manually turn handle 20 so that normally water would flow through the spout, such would not occur since a watertight connection has now been produced between the outer end of the spout and the resilient member 36.

At this particular time, the shackle 42 of a padlock is to be inserted through the through hole 40. This shackle 42 extends in part within the cutout 44 and is located within the annular concave area 24. At this particular time, if one were to attempt to disengage the cap 26 from the faucet 10, the shackle 42 would interfere with the threads 22 preventing disengagement of such. In essence, the faucet 10 has been rendered inoperative. Only when the shackle 42 is removed and the cap disconnected from the faucet 10, can the faucet 10 be operated in a normal manner.

What is claimed is:

1. In combination with a faucet, said faucet having a spout through which water is to be dispensed, said spout having an exterior wall, said exterior wall having a first series of screw threads, a locking apparatus for connection to said faucet to prevent unauthorized operation of said faucet and dispensing of the water, said locking apparatus comprising:

a cap having an interior chamber having a first longitudinal center axis, said interior chamber having an access opening which is open to the ambient at one end and closed at its inner end, said interior chamber having a wall surface, said wall surface having a second series of screw threads, said second series to connect with said first series; and a single through cylindrical hole formed within said cap, said through hole having a second longitudinal center axis, said second longitudinal center axis being oriented transverse to and spaced from said first longitudinal center axis, said through hole tangentially connecting with said interior chamber forming a cutout, said through hole to removably connect with a shackle of a padlock with the shackle connecting with said cutout and located to interfere with said first series of screw threads preventing disengagement of said cap from said faucet.

2. The combination as defined in claim 1 wherein:
said second longitudinal center axis being located substantially perpendicular to said first longitudinal center axis.

3. The combination as defined in claim 2 wherein:
said through hole being located nearer said access opening than said inner end.

4. The combination as defined in claim 3 including:
a resilient member being located at said inner end, said resilient member to press tightly against the outer end of said spout when said cap is installed on said faucet to thereby prevent discharge of water from said faucet.

* * * * *